(12) United States Patent
Hama et al.

(10) Patent No.: US 9,094,551 B2
(45) Date of Patent: Jul. 28, 2015

(54) IMAGE PROCESSING APPARATUS HAVING A TOUCH PANEL

(75) Inventors: Kenro Hama, Amagasaki (JP); Katsuhiko Akita, Amagasaki (JP); Shoji Imaizumi, Shinshiro (JP); Hiroki Tajima, Toyokawa (JP); Yuji Okamoto, Amagasaki (JP)

(73) Assignee: KONICA MINOLTA BUSINESS TECHNOLOGIES, INC., Chiyoda-Ku,Tokyo (JP)

( * ) Notice: Subject to any disclaimer, the term of this patent is extended or adjusted under 35 U.S.C. 154(b) by 126 days.

(21) Appl. No.: 13/570,830

(22) Filed: Aug. 9, 2012

(65) Prior Publication Data

US 2013/0044340 A1    Feb. 21, 2013

(30) Foreign Application Priority Data

Aug. 19, 2011    (JP) .................... 2011-179334

(51) Int. Cl.
| | | |
|---|---|---|
| *G06K 15/02* | (2006.01) | |
| *H04N 1/00* | (2006.01) | |
| *G06F 3/0488* | (2013.01) | |

(52) U.S. Cl.
CPC ........ *H04N 1/00411* (2013.01); *G06F 3/04883* (2013.01); *H04N 1/00381* (2013.01); *G06F 2203/04808* (2013.01)

(58) Field of Classification Search
None
See application file for complete search history.

(56) References Cited

U.S. PATENT DOCUMENTS

| 8,325,141 | B2 * | 12/2012 | Marsden ................ 345/168 |
| 8,654,085 | B2 * | 2/2014 | Lessing ................. 345/173 |
| 2007/0013945 | A1 | 1/2007 | Yoshida et al. |
| 2011/0102843 | A1 * | 5/2011 | Yoshida et al. ........... 358/1.15 |
| 2011/0185308 | A1 | 7/2011 | Machida |

FOREIGN PATENT DOCUMENTS

| JP | 8-076926 A | 3/1996 |
| JP | 11-102274 A | 4/1999 |
| JP | 2000-163031 A | 6/2000 |
| JP | 2007-21777 A | 2/2007 |
| JP | 2010-032679 A | 2/2010 |
| JP | 2011-154555 A | 8/2011 |

OTHER PUBLICATIONS

Japanese Office Action (Notice of Grounds for Rejection) dated Nov. 12, 2013, issued by the Japanese Patent Office in corresponding Japanese Patent Application No. 2011-179334, and English language translation of Office Action. (7 pages).

* cited by examiner

*Primary Examiner* — Ashish K Thomas (74) *Attorney, Agent, or Firm* — Buchanan Ingersoll & Rooney PC (57) ABSTRACT

An image processing apparatus includes an operation panel as a touch panel and a CPU for performing processing based on a gesture thereon. The CPU includes a determination unit for determining a detail of processing corresponding to the gesture. When the detail of processing corresponding to the gesture includes a first detail of processing as processing on a file and a second detail of processing as processing on a displayed image and when the file targeted for the processing is stored in a storage device, the determination unit determines the detail of processing as the first detail of processing.

21 Claims, 11 Drawing Sheets

IMAGE PROCESSING APPARATUS HAVING A TOUCH PANEL

This application is based on Japanese Patent Application No. 2011-179334 filed with the Japan Patent Office on Aug. 19, 2011, the entire content of which is hereby incorporated by reference.

BACKGROUND OF THE INVENTION

1. Field of the Invention

The present invention relates to an image processing apparatus, and more particularly relates to an image processing apparatus having a touch panel.

2. Description of the Related Art

In portable telephones, image processing apparatuses and the like, an operation input device is restricted in space. On the other hand, with the trend toward multiple functions, the types of operations are on the increase. As a result, there is an increasing need to associate a key with a plurality of functions to enable an operation with a combination of keystrokes.

A touch panel is widely adopted these days as an operation input device. The touch panel has an advantage in its easy operability, but is likely to cause misoperation.

As a technique for preventing misoperation on the touch panel, Japanese Laid-Open Patent Publication No. 2010-032679, for example, discloses a technique for not accepting a touch operation on the touch panel during a cleaning mode. Japanese Laid-Open Patent Publication No. 08-076926 discloses a technique for distinguishing between instructions depending on the number of fingers being slid.

Some touch panels serving as the operation input device of portable telephone, image processing apparatus or the like show different details of processing for similar operations because the touch panels are restricted in area. In this case, a problem arises in that, if a user makes a gesture on the touch panel intending for a certain detail of processing, the device may determine it as a different detail of processing.

SUMMARY OF THE INVENTION

The present invention was made in view of such a problem, and has an object to provide an image processing apparatus, a control method and a control program that can improve user operability and can prevent malfunction and misoperation.

To achieve the above-described object, according to an aspect of the present invention, an image processing apparatus includes a touch panel, and a processing unit for performing processing based on a gesture on the touch panel. The processing unit includes a determination unit for determining a detail of processing corresponding to the gesture. When the detail of processing corresponding to the gesture includes a first detail of processing as processing on a file and a second detail of processing as processing on an image displayed on the touch panel and when the file targeted for the processing is stored in a storage device, the determination unit determines the detail of processing corresponding to the gesture as the first detail of processing.

Preferably, the processing unit further includes an acquisition unit for acquiring the file by sending a request for the file to a server including the storage device based on a first gesture on the touch panel, and the determination unit determines the detail of processing corresponding to the gesture as the first detail of processing by the acquisition unit acquiring a response from the server that the file is registered in the storage device.

Preferably, the processing unit further includes a receiving unit for receiving a selection between the first detail of processing and the second detail of processing as the detail of processing corresponding to the gesture when the file targeted for the processing is stored in the storage device. When the file targeted for the processing is stored in the storage device and when the selection of the first detail of processing is received in the receiving unit, the determination unit determines the detail of processing corresponding to the gesture as the first detail of processing.

According to another aspect of the present invention, an image processing apparatus includes a touch panel, a processing unit for performing processing based on a gesture on the touch panel, an authentication unit for performing user authentication, and a storage unit for storing user information. The processing unit includes a determination unit for determining a detail of processing corresponding to the gesture. When the detail of processing corresponding to the gesture includes a first detail of processing as processing on a file and a second detail of processing as processing on an image displayed on the touch panel and when user information on a user having performed the gesture includes defining information that defines one of the details of processing as the detail of processing corresponding to the gesture, the determination unit determines the detail of processing corresponding to the gesture based on the defining information.

Preferably, the image processing apparatus further includes a setting unit for setting the defining information.

Preferably, the defining information defines the number of contacts on the touch panel to be used in the gesture when the detail of processing corresponding to the gesture is determined as the first detail of processing and the number of contacts on the touch panel to be used in the gesture when the detail of processing corresponding to the gesture is determined as the second detail of processing.

Preferably, even when the user information does not include the defining information, the determination unit determines the detail of processing corresponding to the gesture as the first detail of processing when the file targeted for the processing associated with a user authenticated by the user authentication is stored in a storage device.

According to still another aspect of the present invention, a method of controlling is a method of controlling an image processing apparatus having a touch panel, including the steps of receiving a gesture on the touch panel, determining a detail of processing corresponding to the gesture, and executing the processing as determined. When the detail of processing corresponding to the gesture includes a first detail of processing as processing on a file and a second detail of processing as processing on an image displayed on the touch panel and when the file targeted for the processing is stored in a storage device, it is determined in the step of determining that the detail of processing corresponding to the gesture is the first detail of processing, and in the step of executing, processing as the first detail of processing is executed on the file targeted for the processing.

According to still another aspect of the present invention, a method of controlling is a method of controlling an image processing apparatus having a touch panel, including the steps of performing user authentication, receiving a gesture on the touch panel, determining a detail of processing corresponding to the gesture, and executing the processing as determined. When the detail of processing corresponding to the gesture includes a first detail of processing as processing on a file and a second detail of processing as processing on an image displayed on the touch panel and when user information on a user having performed the gesture includes defining information that defines one of the details of processing as the detail of processing corresponding to the gesture, the detail of processing corresponding to the gesture is determined based on the defining information in the step of determining.

According to still another aspect of the present invention, a non-transitory computer-readable storage medium has stored therein a program for causing an image processing apparatus having a touch panel and a controller connected to the touch panel to execute processing. The program instructs the controller to perform the steps of receiving a gesture on the touch panel, determining a detail of processing corresponding to the gesture, and executing the processing as determined. When the detail of processing corresponding to the gesture includes a first detail of processing as processing on a file and a second detail of processing as processing on an image displayed on the touch panel and when the file targeted for the processing is stored in a storage device, the controller, in the step of determining, determines the detail of processing corresponding to the gesture as the first detail of processing, and the controller, in the step of executing, executes processing as the first detail of processing on the file targeted for the processing.

According to still another aspect of the present invention, a non-transitory computer-readable storage medium has stored therein a program for causing an image processing apparatus having a touch panel and a controller connected to the touch panel to execute processing. The program instructs the controller to perform the steps of performing user authentication, receiving a gesture on the touch panel, determining a detail of processing corresponding to the gesture, and executing the processing as determined. When the detail of processing corresponding to the gesture includes a first detail of processing as processing on a file and a second detail of processing as processing on an image displayed on the touch panel and when user information on a user having performed the gesture includes defining information that defines one of the details of processing as the detail of processing corresponding to the gesture, the controller, in the step of determining, determines the detail of processing corresponding to the gesture based on the defining information.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings. In the following description, like parts and components are denoted by like reference characters. They are named and function identically as well.

<System Configuration>

Figure 1:
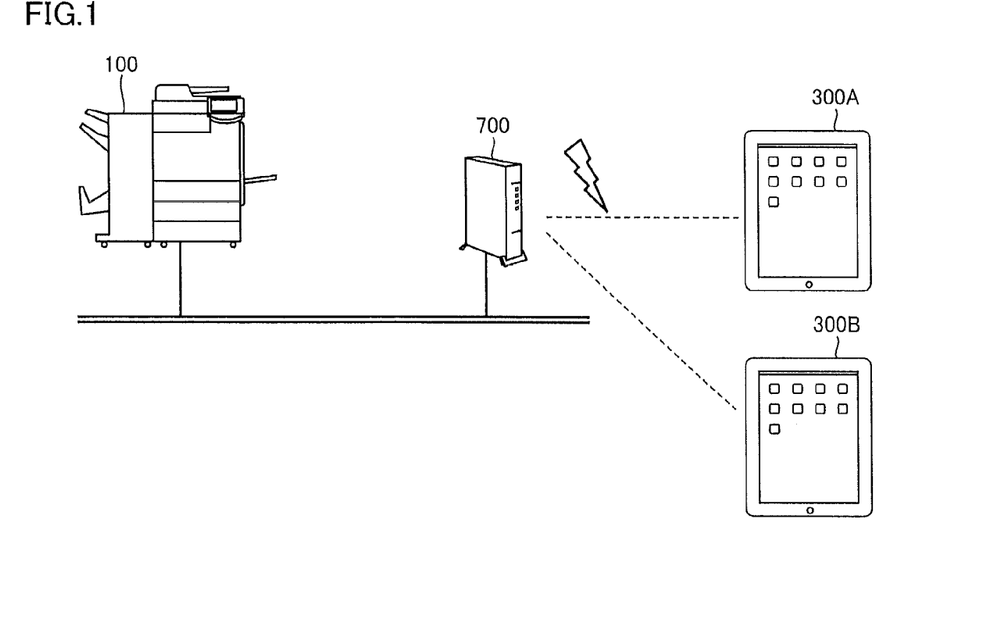
FIG. 1 shows a specific example of a configuration of an image processing system according to an embodiment.

FIG. 1 shows a specific example of a configuration of an image processing system according to the present embodiment.

Referring to FIG. 1, the image processing system according to the present embodiment includes an MFP 100 as an example of an image processing apparatus, a plurality of portable terminals 300A and 300B as terminal devices. They are connected through a network, such as LAN (Local Area Network). Portable terminals 300A and 300B will be collectively referred to as a portable terminal 300.

The network may be wired or may be wireless. As an example, as shown in FIG. 1, MFP 100 and a wireless LAN access point 700 are connected to a wired LAN, and portable terminal 300 is connected to wireless LAN access point 700 through a wireless LAN.

The image processing apparatus is not limited to MFP, but may be any kind of image processing apparatus that has a touch panel as a structure for accepting an operation input. Other examples may include a copying machine, a printer, a facsimile machine, and the like.

Portable terminal 300 may be any device that has a touch panel as a structure for accepting an operation input. For example, it may be a portable telephone with a touch panel, a personal computer, PDA (Personal Digital Assistants), or an image processing apparatus such as MFP.

<Configuration of MFP>

Figure 2:
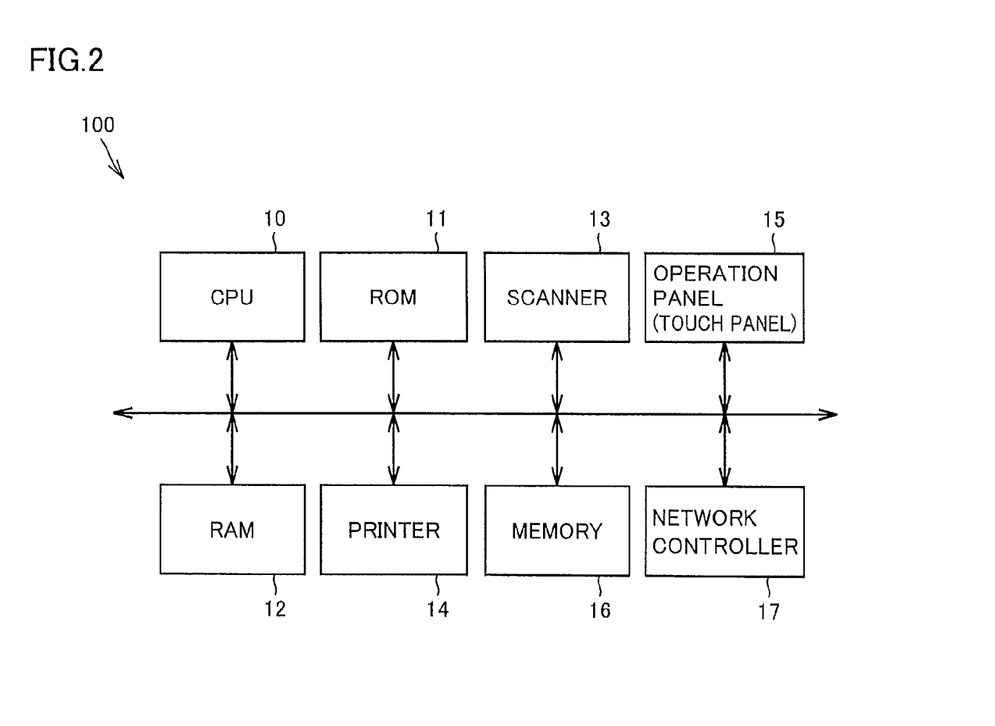
FIG. 2 shows a specific example of a hardware configuration of MFP (Multi-Functional Peripheral) included in the image processing system.

FIG. 2 shows a specific example of a hardware configuration of MFP 100.

Referring to FIG. 2, MFP 100 includes a CPU (Central Processing Unit) 10 as an arithmetic device for overall control, a ROM (Read Only Memory) 11 for storing programs and the like to be executed by CPU 10, a RAM (Random Access Memory) 12 for functioning as a working area during execution of a program by CPU 10, a scanner 13 for optically reading a document placed on a document table not shown to obtain image data, a printer 14 for fixing image data on a printing paper, an operation panel 15 including a touch panel for displaying information and receiving an operation input to MFP 100 concerned, a memory 16 for storing image data as a file, and a network controller 17 for controlling communications through the above-described network.

Operation panel 15 includes the touch panel and an operation key group not shown. The touch panel is composed of a display device such as a liquid crystal display and a pointing device such as an optical touch panel or a capacitance touch panel, the display device and the pointing device overlapping each other, and displays an operation screen so that an indicated position on the operation screen is identified. CPU 10 causes the touch panel to display the operation screen based on data stored previously for causing screen display.

The indicated position (position of touch) on the touch panel as identified and an operation signal indicating a pressed key are input to CPU 10. CPU 10 identifies details of manipulation based on the pressed key or the operation screen being displayed and the indicated position, and executes a process based thereon.

<Configuration of Portable Terminal>

Figure 3:
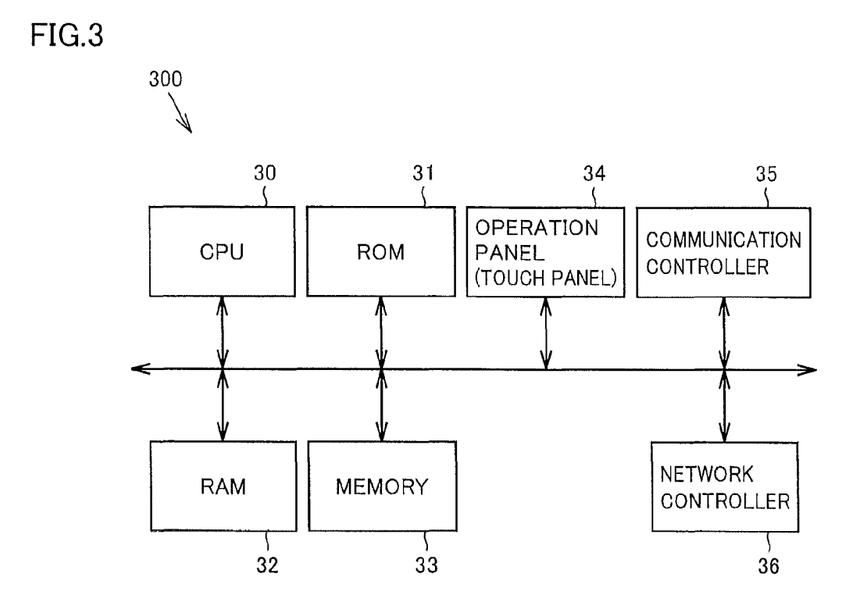
FIG. 3 shows a specific example of a hardware configuration of a portable terminal included in the image processing system.

FIG. 3 shows a specific example of a hardware configuration of portable terminal 300.

Referring to FIG. 3, portable terminal 300 includes a CPU 30 as an arithmetic device for overall control, a ROM 31 for storing programs and the like to be executed by CPU 30, a RAM 32 for functioning as a working area during execution of a program by CPU 30, a memory 33 for storing image data as a file or storing another type of information, an operation panel 34 including a touch panel for displaying information and receiving an operation input to portable terminal 300 concerned, a communication controller 35 for controlling communications through telephone lines by communicating with a base station not shown, and a network controller 36 for controlling communications through the above-described network.

Operation panel 34 may have a configuration similar to that of operation panel 15 of MFP 100. That is, as an example, operation panel 34 includes a touch panel composed of a display device such as a liquid crystal display and a pointing device such as an optical touch panel or a capacitance touch panel, the display device and the pointing device overlapping each other.

CPU 30 causes the touch panel to display an operation screen based on data stored previously for causing screen display. On the touch panel, the indicated position on the operation screen is identified, and an operation signal indicating that position is input to CPU 30. CPU 30 identifies details of manipulation based on the operation screen being displayed and the indicated position, and executes a process based thereon.

<Outline of Operation>

The image processing system performs an operation in which a file is indicated by a "pinch-in" gesture made on an operation panel as the touch panel of a first device, and the above-described file is transmitted to a second device by a "pinch-out" gesture made on an operation panel as the touch panel of the second device.

The pinch-in and pinch-out gestures will now be described.

Figure 4:
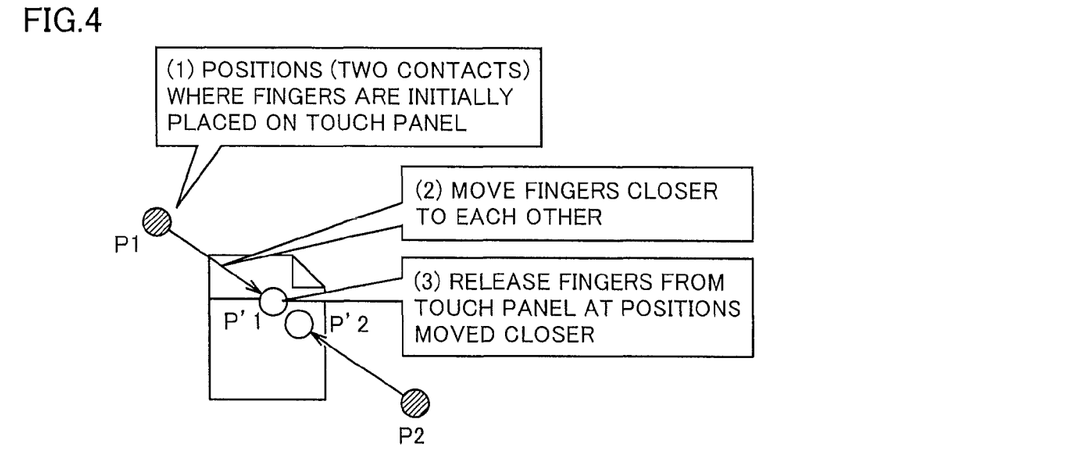
FIG. 4 illustrates a pinch-in gesture.

FIG. 4 illustrates a "pinch-in" gesture. Referring to FIG. 4, the "pinch-in" or pinching gesture refers to a motion of making two contacts P1 and P2 on an operation panel using, for example, two fingers or the like, and then moving the fingers closer to each other from their initial positions linearly or substantially linearly, and releasing the two fingers from the operation panel at two contacts P'1 and P'2 moved closer.

When it is detected that two contacts P1 and P2 on the operation panel have been made simultaneously, and further, the respective contacts have been continuously displaced from their initial positions linearly or substantially linearly, and both the contacts have been released almost simultaneously at two contacts P'1 and P'2 positioned at a spacing narrower than the spacing between their initial positions, CPU detects that the "pinch-in" gesture has been performed.

Figure 5:
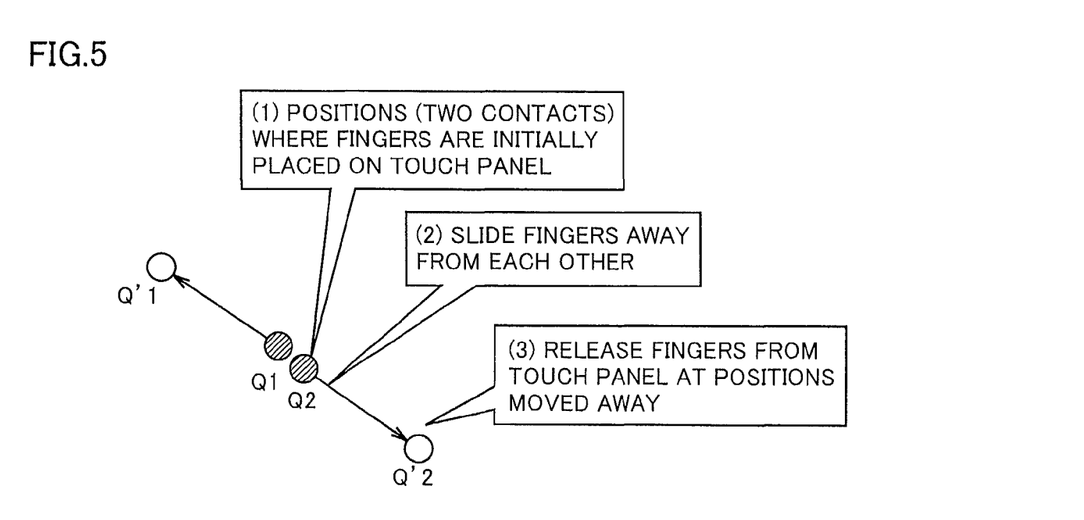
FIG. 5 illustrates a pinch-out gesture.

FIG. 5 illustrates a "pinch-out" gesture. Referring to FIG. 5, the "pinch-out" or anti-pinching gesture refers to a motion of making two contacts Q1 and Q2 on an operation panel using, for example, two fingers or the like, and then moving the fingers away from their initial positions linearly or substantially linearly, and releasing the two fingers from the operation panel at two contacts Q'1 and Q'2 moved away to some degree.

When it is detected that two contacts Q1 and Q2 on the operation panel have been made simultaneously, and further, the respective contacts have been continuously displaced from their initial positions linearly or substantially linearly, and both the contacts have been released almost simultaneously at two contacts Q'1 and Q'2 positioned at a spacing wider than the spacing between their initial positions, CPU detects that the "pinch-out" or de-pinching gesture has been performed.

The above description has explained the example of performing the pinch-in and pinch-out gestures using two fingers. Hereinbelow, description will be made assuming that two fingers are used unless otherwise specified.

However, as will be described later, the number of fingers used is not limited to two, but may be more than two. Also in that case, a gesture of moving the fingers continuously toward one point shall be the "pinch-in" gesture, and a gesture of moving the fingers continuously away from one point shall be the "pinch-out" gesture. This manner of thinking similarly applies to the following description.

There is a gesture of instructing scale-down of an image being displayed on the touch panel by a gesture of bringing two contacts closer to each other linearly or substantially linearly, similarly to the above-described "pinch-in" gesture. These two gestures instruct completely different details of processing with substantially the same detail of gesture. Similarly, there is a gesture of instructing scale-up of an image being displayed on the touch panel by a gesture of moving two contacts away from each other linearly or substantially linearly, similarly to the "pinch-out" gesture. These two gestures also instruct completely different details of processing with substantially the same detail of gesture.

Accordingly, when a gesture of the same "pinch-in" action is made, CPU cannot distinguish between a gesture by which a user intends to indicate a file and a gesture by which the user intends to scale down an image. The same applies to gestures of "pinch-out" action.

Therefore, in the image processing system according to the present embodiment, in order to distinguish between these gestures and other similar gestures on the touch panel, the user individually sets a detail of gesture for each detail of processing for use as user specific information. Information that defines the detail of gesture will be referred to as "customization information" in the following description.

In addition, with the timing of a gesture, it is automatically determined which one of that gesture and a similar gesture is to be made effective, and processing is performed in accordance with the detail of processing of the gesture made effective.

Here, as a specific example, the case of distinguishing between a "pinch-out" instruction and a scale-up instruction with gestures of "pinch-out" action will be described.

Figure 6:
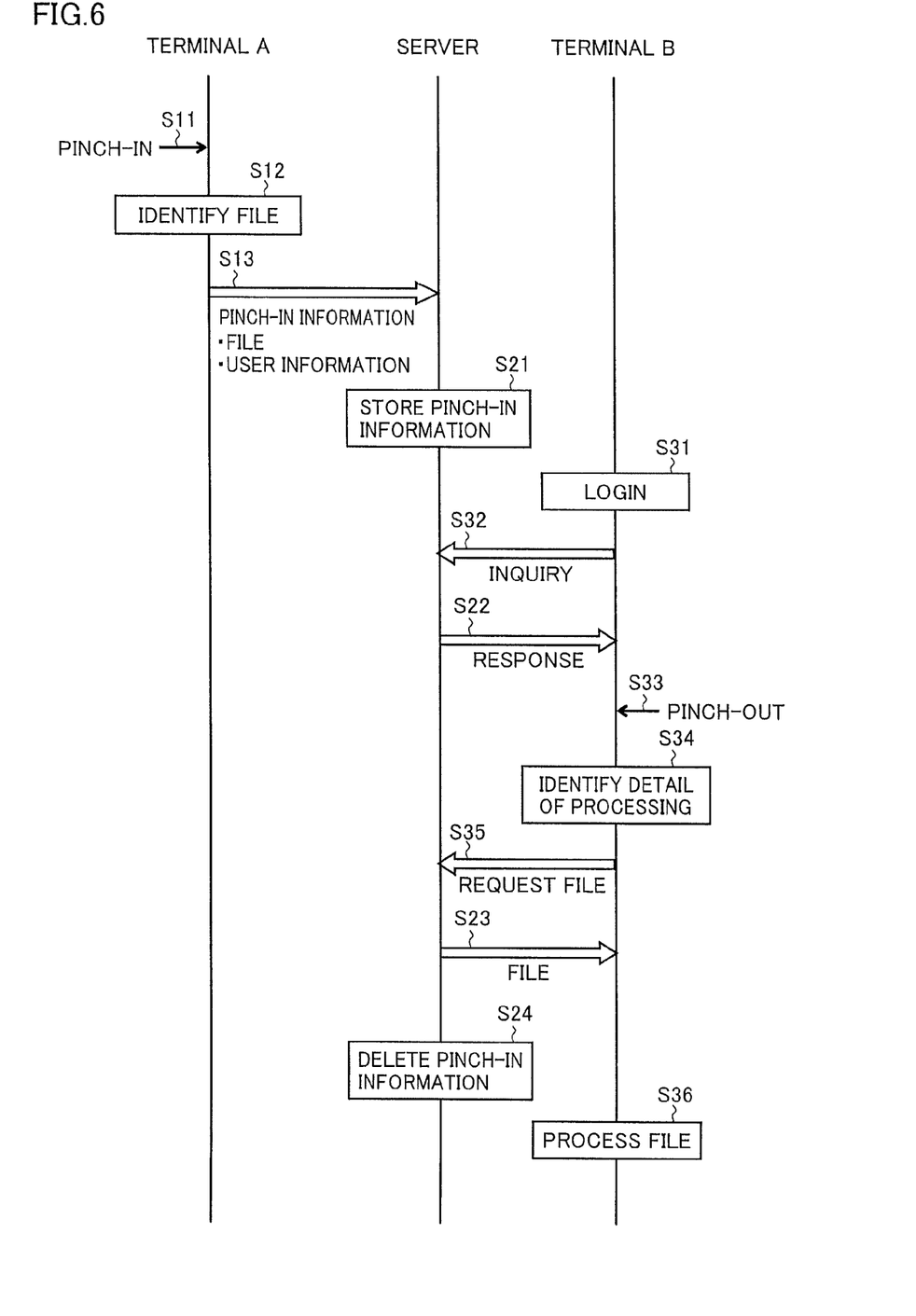
FIG. 6 shows the flow of operations in the image processing system.

FIG. 6 shows the flow of operations in the image processing system. The flow of operation in the image processing system will be described with reference to FIG. 6.

Referring to FIG. 6, when a pinch-in gesture is made with a screen showing a file list being displayed on operation panel 34 of portable terminal 300A (a terminal A in FIG. 7) which is a first device (Step S11), a file indicated in portable terminal 300A is identified in Step S12, and information including file information and information that identifies a user having performed that gesture (e.g., login information etc.) is transmitted to MFP 100 in Step S13. In the following description, this information will also be referred to as "pinch-in information."

The pinch-in information may include information that identifies a file, such as the file name, for example, instead of the file itself. The information that identifies the user having performed that gesture may be user information associated with portable terminal 300, for example, besides login information.

MFP 100 serves as a server in the image processing system. It is noted that, when the image processing system includes a server not shown, that server may execute operations of MFP 100 which will be described below.

Upon receipt of pinch-in information, MFP 100 stores it in a predetermined region of memory 16 in Step S21.

When a login operation is performed in portable terminal 300B (a terminal B in FIG. 7) which is a second device (Step S31), portable terminal 300B transmits in Step S32 login information to MFP 100 to inquire whether pinch-in information and customization information associated with that user are registered or not.

Upon receipt of this inquiry, MFP 100 searches for the pinch-in information and customization information based on user information, and makes a response to portable terminal 300B as to the presence/absence (Step S22).

When a pinch-out gesture is then made on operation panel 34 of portable terminal 300B (Step S33), the detail of processing corresponding to the current pinch-out gesture is identified in Step S34 depending on the presence/absence of pinch-in information and customization information or depending on the contents of customization information (Step S34). That is, when MFP 100 has registered therein customization information associated with that user, the detail of processing corresponding to the pinch-out gesture is identified in accordance with that customization information. On the other hand, when MFP 100 does not have registered therein customization information but MFP 100 has registered therein pinch-in information associated with that user, the detail of processing corresponding to that pinch-out gesture is determined as processing requesting a file, rather than scale-up processing.

Portable terminal 300B then sends a request for a file to MFP 100 in accordance with that gesture (Step S35), and receives the file transmitted (Step S23) from MFP 100.

Upon transmission of the file included in the pinch-in information to portable terminal 300B, MFP 100 deletes the pinch-in information stored in the predetermined region of memory 16 (Step S24).

Portable terminal 300B having acquired the above-described file executes previously defined processing on that file (Step S36). As an example, this processing may be processing of storing that file in a folder identified by the pinch-out gesture, or may be processing of executing processing identified by the pinch-out gesture on that file.

<Functional Configuration>

Figure 7:
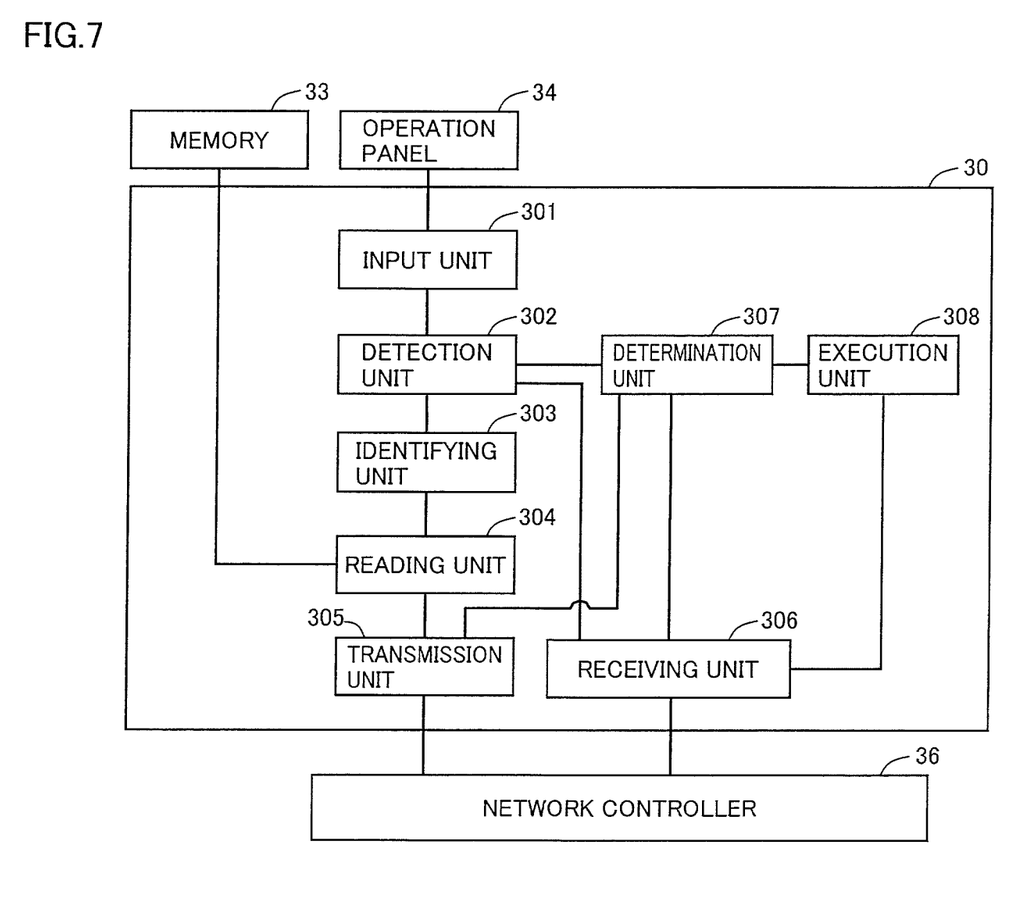
FIG. 7 is a block diagram showing a specific example of a functional configuration of the portable terminal.

FIG. 7 is a block diagram showing a specific example of a functional configuration of portable terminal 300 for executing the above-described operations. Each function shown in FIG. 7 is a function mainly configured in CPU 30 by CPU 30 reading a program stored in ROM 31 and executing the program on RAM 32. However, at least some functions may be configured by the hardware configuration shown in FIG. 3.

Referring to FIG. 7, portable terminal 300 includes an input unit 301 for receiving input of an operation signal showing an instruction on operation panel 34, a detection unit 302 for detecting the above-described pinch-in gesture, pinch-out gesture and login operation based on the operation signal, an identifying unit 303 for identifying a targeted file in accordance with the position of the detected pinch-in gesture, a reading unit 304 for reading the identified file from memory 33, a transmission unit 305 for previously storing access information to MFP 100 and transmitting information to MFP 100 through network controller 36, a receiving unit 306 for receiving information from MFP 100 through network controller 36, a determination unit 307 for determining the detail of processing instructed by the detected pinch-out gesture based on the information received from MFP 100, and an execution unit 308 for executing processing and the like on the file received from MFP 100 in accordance with that determination.

Identifying unit 303 identifies an icon, displayed in an area defined based on at least either two contacts (two contacts P1, P2 in FIG. 4) indicated initially in the pinch-in gesture or two contacts (two contacts P'1, P'2 in FIG. 4) indicated finally, as an icon indicated by the pinch-in gesture.

The method of identifying an icon indicated by the pinch-in gesture in identifying unit 303 is not limited to a certain method. FIGS. 8 to 12 each illustrate a specific example of a method of identifying an icon indicated by the pinch-in gesture in identifying unit 303.

Figure 8:
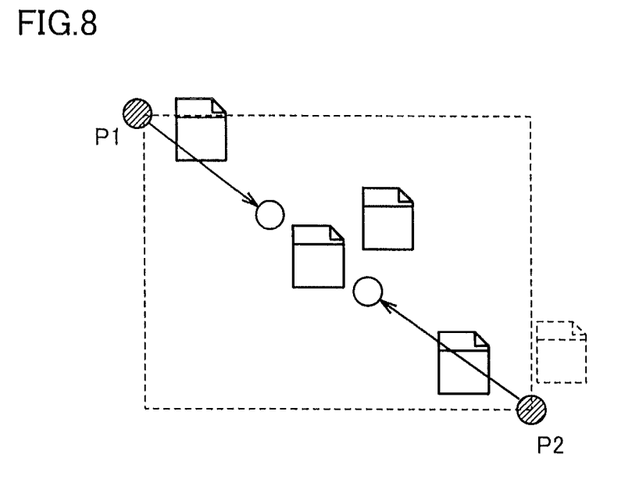
FIGS. 8 to 12 each illustrate a specific example of a method of identifying an icon indicated by the pinch-in gesture.
Figure 9:
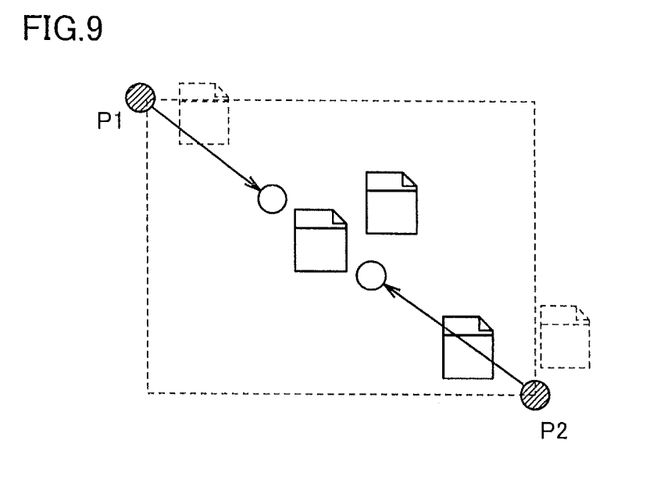

As an example, as shown in FIG. 8, identifying unit 303 may identify a rectangle in which two contacts P1 and P2 indicated initially are at opposite corners as an area defined by the pinch-in gesture, and may identify icons, each of which is at least partially included in that rectangle, may be identified as indicated icons. Alternatively, as shown in FIG. 9, a rectangle in which two contacts P1 and P2 indicated initially at opposite corners may be identified as an area defined by the pinch-in gesture, and icons completely included in that rectangle may be identified as indicated icons. With such identification, the user can indicate an intended icon in an intuitive manner by touching the operation panel with two fingers so as to sandwich the intended icon, and performing a motion for the pinch-in gesture from that state. Even when an icon image is small, it can be indicated correctly.

Figure 10:
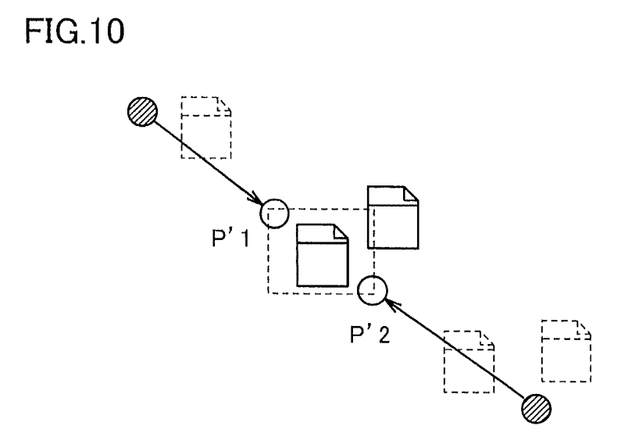
Figure 11:
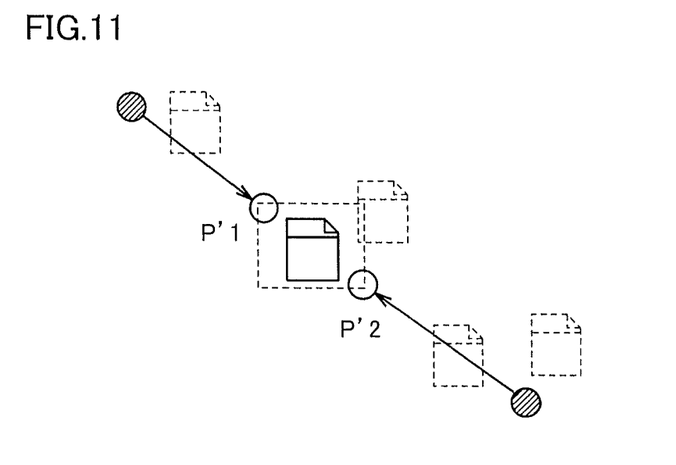

As another example, as shown in FIG. 10, identifying unit 303 may identify a rectangle in which two contacts P'1 and P'2 indicated finally are at opposite corners as an area defined by the pinch-in gesture, and may identify icons, each of which is at least partially included in that rectangle, may be identified as indicated icons. Alternatively, as shown in FIG. 11, a rectangle in which two contacts P'1 and P'2 indicated finally are at opposite corners may be identified as an area defined by the pinch-in gesture, and an icon completely included in that rectangle may be identified as an indicated icon. With such identification, the user can indicate an intended icon in an intuitive manner by touching the operation panel with two fingers spaced apart, and then moving them closer to each other so that the intended icon is sandwiched finally between the two fingers. Even when an icon image is small, it can be indicated correctly.

Figure 12:
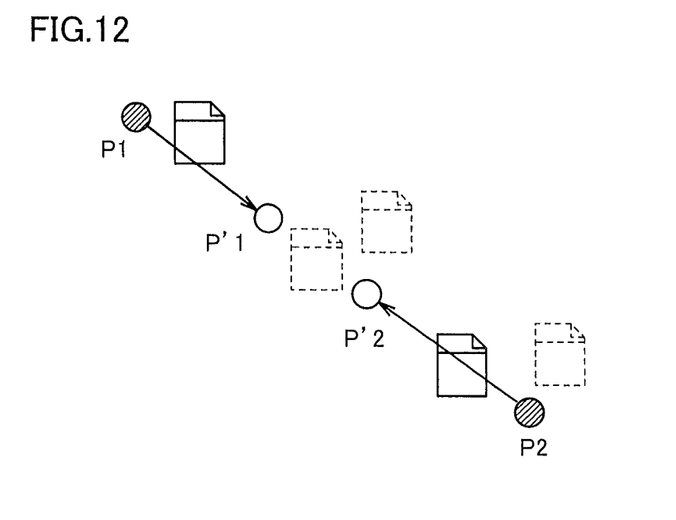

As still another example, as shown in FIG. 12, identifying unit 303 may identify two lines that connect two contacts P1, P2 indicated initially and two contacts P'1, P'2 indicated finally, respectively, as areas defined by the pinch-in gesture, and may identify icons where either one line overlaps as indicated icons. With such identification, the user can indicate an intended icon in an intuitive manner by moving the two fingers so as to pinch in the intended icon. Even when an icon image is small, it can be indicated correctly.

When the pinch-in gesture is detected in detection unit 302, transmission unit 305 transmits pinch-in information including a file identified by that gesture and read by reading unit 304 and user information, to MFP 100 through network controller 36.

On the other hand, when detection unit 302 detects that a login operation has been performed by analyzing an operation signal from operation panel 34, transmission unit 305 transmits user information to MFP 100 through network controller 36 to inquire whether pinch-in information and customization information associated with that user are registered or not.

Upon receipt of a response from MFP 100 in accordance with the above-described inquiry, receiving unit 306 inputs the contents of the response to determination unit 307.

Upon detection that a pinch-out gesture has been performed on operation panel 34 by analyzing the operation signal from operation panel 34, detection unit 302 inputs the operation signal to determination unit 307.

Upon receipt of a response from MFP 100 that customization information associated with that user is registered, determination unit 307 analyzes the operation signal in accordance with that customization information to identify the detail of processing.

When the detail of processing corresponding to the pinch-out gesture is identified in accordance with the customization information as requesting a file included in the pinch-in information and executing previously defined processing on that file, transmission unit 305 sends a request for the file to MFP 100 in accordance with that determination.

The file transmitted from MFP 100 in response to that request is received by receiving unit 306, and is processed in execution unit 308 by the detail of processing in accordance with the determination in determination unit 307.

Upon receipt of a response from MFP 100 that customization information associated with that user is not registered but associated pinch-in information is registered, determination unit 307 identifies the detail of processing instructed by the pinch-out gesture on operation panel 34 as sending a request for a file included in the pinch-in information and executing previously defined processing on that file until processing of the pinch-in information is terminated. Then, upon completion of processing of the pinch-in information, determination unit 307 identifies the detail of processing of the pinch-out gesture as processing of scaling up an image displayed on operation panel 34.

Transmission unit 305 sends a request for a file to MFP 100 in accordance with that determination, and the file transmitted from MFP 100 is received by receiving unit 306. The file is then processed in execution unit 308 by the detail of processing in accordance with the determination in determination unit 307.

Upon receipt of a response from MFP 100 that neither customization information nor pinch-in information associated with that user is registered, determination unit 307 identifies the detail of processing instructed by the pinch-out gesture on operation panel 34 as processing of scaling up an image displayed on operation panel 34. In this case, execution unit 308 executes the processing of scaling up an image displayed on operation panel 34.

Memory 16 of MFP 100 is provided with a storage area for storing pinch-in information and a storage area for storing customization information. As the functional configuration of MFP 100, the function for storing, in the above-described storage area, pinch-in information when received from portable terminal 300 through network controller 17, the function for setting customization information in association with a user and storing it in the above-described storage area, the function for, in response to an inquiry transmitted together with user information, searching for pinch-in information and customization information using that user information and transmitting the presence/absence thereof and the customization information to portable terminal 300 which is a requester, and the function for transmitting a file included in pinch-in information in response to a request from portable terminal 300 and deleting the pinch-in information from the above-described storage area upon completion of the transmission are not shown but included in CPU 10.

Figure 13:
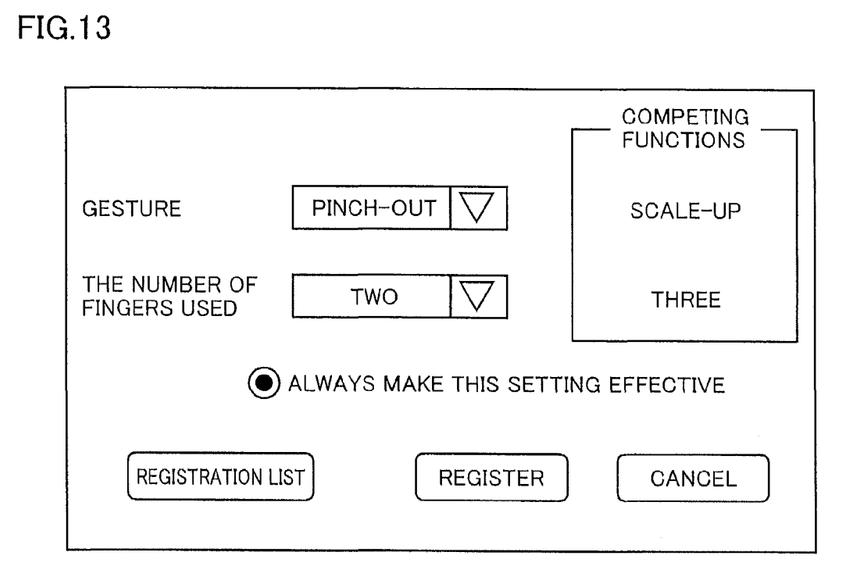
FIG. 13 shows a specific example of screen for setting customization information.

FIG. 13 shows a specific example of screen for setting customization information.

When customization information shall be set in MFP 100, the screen shown in FIG. 13 is displayed on operation panel 15. Alternatively, the screen may be displayed on operation panel 34 of portable terminal 300, and details input on the screen shown in FIG. 13 may be transmitted to MFP 100 so that setting is made in MFP 100.

Still alternatively, when customization information shall be set in portable terminal 300, the screen shown in FIG. 13 is displayed on operation panel 34.

In any case, this screen is displayed on the operation panel with a user logged in. CPU of a device that sets customization information has previously stored therein combinations of gestures instructing different details of processing with similar gestures. In the example of FIG. 13, as "competing functions", the combination of the above-described pinch-out gesture, i.e., the gesture of identifying a file, and a gesture of instructing image enlargement is stored in connection with gestures of "pinch-out" action.

As another combination, the combination of the above-described pinch-in gesture and the gesture of instructing image shrinkage may be stored in connection with gestures of "pinch-in" action, as described above. Furthermore, still another combination may be stored.

In a box for identifying a gesture on the screen of FIG. 13, the gesture to be targeted for setting is input or selected, and as an example, the number of fingers to be used in that gesture is identified. In the example of FIG. 13, setting is made that two fingers are used in the pinch-out gesture, and three fingers are used in the gesture of instructing scale-up.

When a "register" button is pressed under these conditions, CPU sets and registers information having been set in association with the login user, as customization information. In addition, customization information already registered may be changed or deleted using the screen of FIG. 13.

Furthermore, when the detail of the pinch-out gesture is set using the screen as shown in FIG. 13, the details of pinch-in gesture corresponding to that pinch-out gesture may be set automatically. That is, from the point of view that, since the pinch-in gesture and the pinch-out gesture constitute a set of corresponding gestures, the same number of fingers will be used for the gestures when performed by the same user, the number of fingers set to be used in one of the gestures may be automatically set as the number of fingers to be used in the other gesture.

<Flow of Operation>

Figure 14:
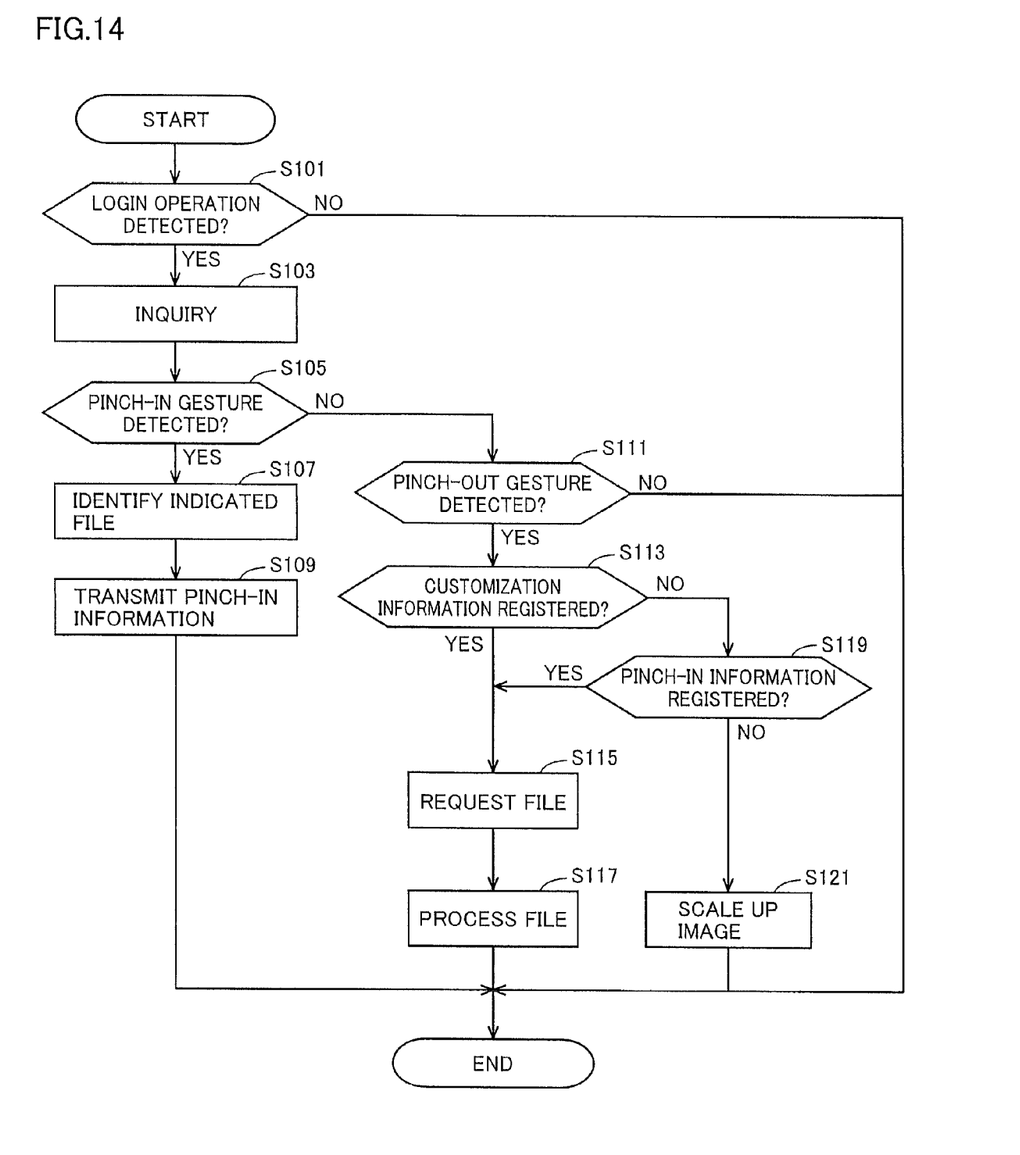
FIG. 14 is a flow chart showing the flow of operations in the portable terminal.

FIG. 14 is a flow chart showing the flow of operations in portable terminal 300. The operations shown in the flow chart of FIG. 14 are implemented by CPU 30 reading a program stored in ROM 31 and executes the program on RAM 32, and causing each function shown in FIG. 7 to be exerted.

Referring to FIG. 14, when a login operation on operation panel 34 is detected (YES in Step S101), CPU 30 transmits user information to MFP 100 to inquire whether customization information and pinch-in information associated with a user concerned are registered or not (Step S103).

When a pinch-in gesture on operation panel 34 is detected (YES in Step S105), CPU 30 identifies a file targeted for that gesture based on contacts (position of touch) and details displayed on operation panel 34 (Step S107), and transmits the identified file together with the user information as pinch-in information, to MFP 100 (Step S109).

On the other hand, when a pinch-out gesture on operation panel 34 is detected (YES in Step S111), CPU 30 performs a different operation in accordance with the response from MFP 100 to the inquiry in the above-described step S103.

That is, when a response that customization information associated with that user is registered is received from MFP 100 (YES in Step S113), CPU 30, based on that customization information, identifies the detail of processing instructed by the detected pinch-out gesture as processing of indicating a file, and sends a request to MFP 100 for a file included in pinch-in information (Step S115). Then, previously defined processing is executed on the file transmitted from MFP 100 in response to that request (Step S117).

Specifically, it is assumed that customization information set as shown in FIG. 13 is registered for the pinch-out gesture. In this case, when a gesture using two fingers, that is, a pinch-out gesture by moving two contacts is detected in the above-described step S111, that gesture is identified as a gesture of indicating a file. When a gesture using three fingers, that is, a pinch-out gesture by moving three contacts is detected, that gesture is identified as a gesture of scaling up an image.

When a response that customization information associated with that user is not registered but pinch-in information is registered is received from MFP 100 (NO in Step S113 and YES in S119), the detail of processing instructed by the detected pinch-out gesture is identified as processing of indicating a file, and a request for a file included in pinch-in information is sent to MFP 100 (Step S115). Then, previously defined processing is executed on the file transmitted from MFP 100 in response to that request (Step S117).

Herein, since the pinch-out gesture is determined as a gesture of indicating a file when pinch-in information is registered in MFP 100, this gesture is not determined as such after transmission of the pinch-in information from MFP 100 to portable terminal 300 is completed and the pinch-in information is deleted. That is, such a determination is made only while the pinch-in information is registered in MFP 100, and this determination will be canceled after the pinch-in information is deleted from MFP 100.

When a response that neither customization information nor pinch-in information associated with that user is registered is received from MFP 100 (NO in Step S113 and NO in S119), CPU 30 identifies the detail of processing instructed by the detected pinch-out gesture as processing of scaling up an image displayed on operation panel 34, and executes the processing of scaling up an image being displayed (Step S121).

<Variation 1>

Figure 15:
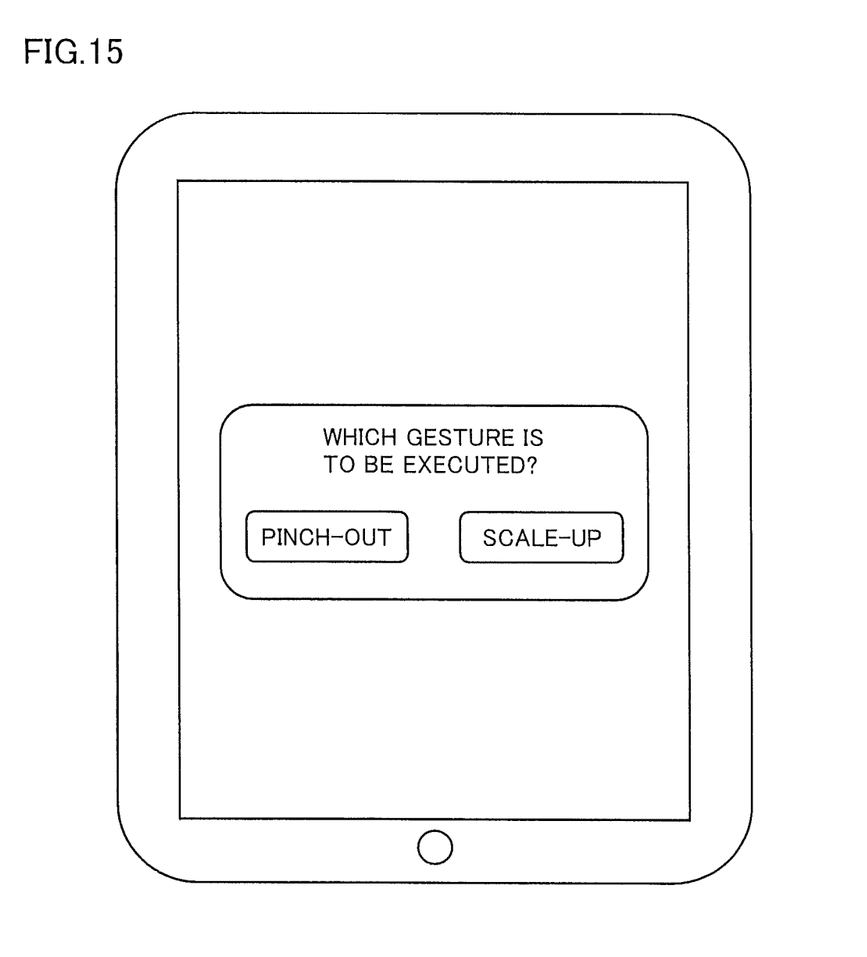
FIG. 15 shows a specific example of screen for accepting selection of detail of processing.

It is noted that, in the above examples, when pinch-in information is registered, a gesture shall be automatically determined as a gesture of indicating a file, however, a screen as shown in FIG. 15, for example, may be displayed to provide a combination of similar gestures in a selectable manner, and a selection of a user's intended gesture from among them may be accepted. That is, in the case of this example, a selection between a pinch-out gesture as an instruction to indicate a file and a scale-up gesture as an instruction to scale up an image being displayed may be accepted to execute processing in accordance with that selection.

<Variation 2>

It is noted that, in the above examples, when customization information associated with the user is not registered, a request for a file shall be sent or image scale-up processing shall be executed, depending on the presence/absence of registration of pinch-in information.

As an example where customization information is not used, a determination may be made whether a pinch-out gesture is a gesture of indicating a file or a gesture of instructing scale-up, depending on the number of fingers used in the pinch-in gesture and the number of fingers used in the pinch-out gesture.

In this case, upon detection of the pinch-in gesture on operation panel 34, CPU 30 also detects the number of fingers used in that gesture, and transmits pinch-in information including that detected information to MFP 100.

Upon detection of the pinch-out gesture on operation panel 34, CPU 30 also detects the number of fingers used in that gesture. CPU 10 then sends a request for pinch-in information to MFP 100, and as an example, when the number of fingers in the pinch-out gesture included in that pinch-in information and the number of fingers in the pinch-out gesture are equal, CPU 10 may determine that the pinch-out gesture is a gesture of indicating a file, and may execute processing on the file included in the pinch-in information.

This is based on the point of view that, since the pinch-in gesture and the pinch-out gesture constitute a set of corresponding gestures, the same number of fingers will be used for the gestures when performed by the same user, as described above.

<Variation 3>

It is noted that, in the above examples, the pinch-in gesture and the pinch-out gesture shall be performed in portable terminal 300, however, the pinch-in gesture and/or the pinch-out gesture may be performed in MFP 100. In this case, MFP 100 has the functions shown in FIG. 7, and determines the detail of processing in correspondence with the gesture(s).

<Effects of Embodiment>

With the above-described operations performed in the image processing system according to the present embodiment, even if a gesture instructing a different detail of processing with a similar gesture is performed, it is possible to identify the detail of processing corresponding to the gesture in a device. As a result, malfunction and misoperation can be prevented while improving user operability.

Further, a program for causing the above-described operations in portable terminal 300 and MFP 100 to be executed can also be offered. Such a program can be recorded on a computer-readable recording medium, such as a flexible disk attached to a computer, a CD-ROM (Compact Disk-Read Only Memory), a ROM, a RAM, a memory card, or the like, and can be offered as a program product. Alternatively, the program can be offered as recorded on a recording medium such as a hard disk built in a computer. Still alternatively, the program can also be offered by downloading through a network.

It is noted that the program according to the present invention may cause the process to be executed by invoking a necessary module among program modules offered as part of an operating system (OS) of a computer with a predetermined timing in a predetermined sequence. In that case, the program itself does not include the above-described module, but the process is executed in cooperation with the OS. Such a program not including a module may also be covered by the program according to the present invention.

Moreover, the program according to the present invention may be offered as incorporated into part of another program. Also in such a case, the program itself does not include the module included in the above-described other program, and the process is executed in cooperation with the other program. Such a program incorporated into another program may also be covered by the program according to the present invention.

An offered program product is installed in a program storage unit, such as a hard disk, and is executed. It is noted that the program product includes a program itself and a recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus comprising:
a touch panel; and
a processing unit configured to execute processing based on a gesture on said touch panel, said processing unit including a determination unit configured to determine a detail of processing corresponding to said gesture, wherein
(i) when the detail of processing corresponding to said gesture is interpreted by said processing unit as being associated with a first detail of processing as executing previously defined processing on a file and associated with a second detail of processing as processing on an image displayed on said touch panel and (ii) when the file targeted for said processing is stored in a storage device, said determination unit determines the appropriate detail of processing corresponding to said gesture as said first detail of processing, and the processing unit executes the previously defined processing on that file.

2. The image processing apparatus according to claim 1, wherein
said processing unit further includes an acquisition unit for acquiring said file by sending a request for said file to a server including said storage device based on a first gesture on said touch panel, and
said determination unit determines the detail of processing corresponding to said gesture as said first detail of processing by said acquisition unit acquiring a response from said server that said file is registered in said storage device.

3. The image processing apparatus according to claim 1, wherein
said processing unit further includes a receiving unit for receiving a selection between said first detail of processing and said second detail of processing as the detail of processing corresponding to said gesture when the file targeted for said processing is stored in said storage device, and
when the file targeted for said processing is stored in said storage device and when the selection of said first detail of processing is received in said receiving unit, said determination unit determines the detail of processing corresponding to said gesture as said first detail of processing.

4. An image processing apparatus comprising:
a touch panel;
a processing unit configured to execute processing based on a gesture on said touch panel, said processing unit including a determination unit configured to determine a detail of processing corresponding to said gesture;
an authentication unit configured to perform user authentication; and
a storage unit configured to store user information, wherein
(i) when the detail of processing corresponding to said gesture is interpreted by the processing unit as being associated with a first detail of processing as executing previously defined processing on a file and associated with a second detail of processing as processing on an image displayed on said touch panel and (ii) when user information on a user having performed said gesture includes defining information that defines at least one detail of processing as the detail of processing corresponding to said gesture, said determination unit determines the appropriate detail of processing corresponding to said gesture based on said defining information.

5. The image processing apparatus according to claim 4, further comprising a setting unit for setting said defining information.

6. The image processing apparatus according to claim 4, wherein said defining information defines the number of contacts on said touch panel to be used in said gesture when the detail of processing corresponding to said gesture is determined as said first detail of processing and the number of contacts on said touch panel to be used in said gesture when the detail of processing corresponding to said gesture is determined as said second detail of processing.

7. The image processing apparatus according to claim 4, wherein even when said user information does not include said defining information, said determination unit determines the detail of processing corresponding to said gesture as said first detail of processing when the file targeted for said processing associated with a user authenticated by said user authentication is stored in a storage device.

8. A method of controlling an image processing apparatus having a touch panel, comprising the steps of:
receiving a gesture on said touch panel;
determining, by a processing unit, a detail of processing corresponding to said gesture; and
executing, by said processing unit, said determined processing, wherein
(i) when the detail of processing corresponding to said gesture is interpreted by said processing unit as being associated with a first detail of processing as executing previously defined processing on a file and associated with a second detail of processing as processing on an image displayed on said touch panel, and (ii) when the file targeted for said processing is stored in a storage device, said processing unit determines, in said step of determining, that the appropriate detail of processing corresponding to said gesture is said first detail of processing, and executes, in said step of executing, processing on the file targeted for said processing as said first detail of processing.

9. The method of controlling according to claim 8, further comprising the step of sending a request for said file to a server including said storage device based on a first gesture on said touch panel, wherein
it is determined in said step of determining that the detail of processing corresponding to said gesture is said first detail of processing by acquiring a response from said server that said file is registered in said storage device in accordance with said request.

10. The method of controlling according to claim 8, further comprising the step of receiving a selection between said first detail of processing and said second detail of processing as the detail of processing corresponding to said gesture when the file targeted for said processing is stored in said storage device, wherein
when the file targeted for said processing is stored in said storage device and when the selection of said first detail of processing is received in said step of receiving the selection, it is determined in said step of determining that the detail of processing corresponding to said gesture is said first detail of processing.

11. A method of controlling an image processing apparatus having a touch panel, comprising the steps of:
performing, by an authentication unit, user authentication;
receiving a gesture on said touch panel;

determining, by a processing unit, a detail of processing corresponding to said gesture; and executing, by the processing unit, said processing as determined, wherein (i) when the detail of processing corresponding to said gesture is interpreted by said processing unit as being associated with a first detail of processing as executing previously defined processing on a file and associated with a second detail of processing as processing on an image displayed on said touch panel and (ii) when user information on a user having performed said gesture includes defining information that defines at least one detail of processing as the detail of processing corresponding to said gesture, the appropriate detail of processing corresponding to said gesture is determined based on said defining information in said step of determining.

12. The method of controlling according to claim 11, further comprising the step of setting said defining information.

13. The method of controlling according to claim 11, wherein said defining information defines the number of contacts on said touch panel to be used in said gesture when the detail of processing corresponding to said gesture is determined as said first detail of processing and the number of contacts on said touch panel to be used in said gesture when the detail of processing corresponding to said gesture is determined as said second detail of processing.

14. The method of controlling according to claim 11, wherein even when said user information does not include said defining information, it is determined in said step of determining that the detail of processing corresponding to said gesture is said first detail of processing when the file targeted for said processing associated with a user authenticated by said user authentication is stored in a storage device.

15. A non-transitory computer-readable storage medium having stored therein a program for causing an image processing apparatus having a touch panel and a controller connected to said touch panel to execute processing, wherein said program instructs said controller to perform the steps of:

receiving a gesture on said touch panel;

determining a detail of processing corresponding to said gesture; and executing said processing as determined, wherein (i) when the detail of processing corresponding to said gesture is interpreted to be associated with a first detail of processing as processing on a file and to be associated with a second detail of processing as processing on an image displayed on said touch panel and (ii) when the file targeted for said processing is stored in a storage device, said program further instructs the controller, in said step of determining, to determine the appropriate detail of processing corresponding to said gesture as said first detail of processing, and, in said step of executing, to execute processing as said first detail of processing on the file targeted for said processing.

16. The non-transitory computer-readable storage medium according to claim 15, wherein said program further causes said controller to execute the step of sending a request for said file to a server including said storage device based on a first gesture on said touch panel, and said controller, in said step of determining, determines the detail of processing corresponding to said gesture as said first detail of processing by acquiring a response from said server that said file is registered in said storage device in accordance with said request.

17. The non-transitory computer-readable storage medium according to claim 15, wherein said program further causes said controller to execute the step of receiving a selection between said first detail of processing and said second detail of processing as the detail of processing corresponding to said gesture when the file targeted for said processing is stored in said storage device, and when the file targeted for said processing is stored in said storage device and when the selection of said first detail of processing is received in said step of receiving the selection, said controller, in said step of determining, determines the detail of processing corresponding to said gesture as said first detail of processing.

18. A non-transitory computer-readable storage medium having stored therein a program for causing an image processing apparatus having a touch panel and a controller connected to said touch panel to execute processing, wherein said program instructs said controller to perform the steps of:

performing user authentication;

receiving a gesture on said touch panel;

determining a detail of processing corresponding to said gesture; and executing said processing as determined, wherein (i) when the detail of processing corresponding to said gesture is interpreted to be associated with a first detail of processing as executing previously defined processing on a file and a second detail of processing as processing on an image displayed on said touch panel and (ii) when user information on a user having performed said gesture includes defining information that defines at least one detail of processing as the detail of processing corresponding to said gesture, said program further instructs the controller, in said step of determining, to determine the appropriate detail of processing corresponding to said gesture based on said defining information.

19. The non-transitory computer-readable storage medium according to claim 18, wherein said program further causes said controller to execute the step of setting said defining information.

20. The non-transitory computer-readable storage medium according to claim 18, wherein said defining information defines the number of contacts on said touch panel to be used in said gesture when the detail of processing corresponding to said gesture is determined as said first detail of processing and the number of contacts on said touch panel to be used in said gesture when the detail of processing corresponding to said gesture is determined as said second detail of processing.

21. The non-transitory computer-readable storage medium according to claim 18, wherein even when said user information does not include said defining information, said controller, in said step of determining, determines the detail of processing corresponding to said gesture as said first detail of processing when the file targeted for said processing associated with a user authenticated by said user authentication is stored in a storage device.

* * * * *